United States Patent [19]

Avis

[11] 3,839,291

[45] Oct. 1, 1974

[54] WET-STRENGTH RESINS AND PROCESSES FOR MAKING AND USING SAME

[76] Inventor: Robert Paul Avis, 1211 Eagle Rd., West Chester, Pa. 19380

[22] Filed: Nov. 12, 1973

[21] Appl. No.: 414,649

Related U.S. Application Data

[63] Continuation-in-part of Ser. No. 200,588, Nov. 19, 1971, Pat. No. 3,772,225, which is a continuation of Ser. No. 866,387, Oct. 14, 1969, abandoned.

[52] U.S. Cl............... 260/70 R, 162/167, 117/155, 260/17.3, 260/29.2 N, 260/29.4 R, 260/69 R, 260/72 R
[51] Int. Cl............................ C08g 9/00, C08g 9/08
[58] Field of Search..... 260/17.3, 70 R, 69 R, 72 R, 260/29.4 R; 162/167

[56] References Cited
UNITED STATES PATENTS

| | | | |
|---|---|---|---|
| 2,616,874 | 11/1952 | Yost et al. | 260/70 |
| 2,689,239 | 9/1954 | Melamed | 260/70 |
| 2,696,504 | 12/1954 | Yost et al. | 260/70 |
| 2,699,435 | 1/1955 | Auten et al. | 260/70 |
| 3,275,605 | 9/1966 | Eastes et al. | 260/70 |
| 3,763,106 | 10/1973 | Markiewitz | 260/29.4 |

*Primary Examiner*—William H. Short
*Assistant Examiner*—Edward Woodberry
*Attorney, Agent, or Firm*—N. J. DeBenedictis; J. W. Kane

[57] ABSTRACT

A water-soluble, cationic, thermosetting, polyureide-epihalohydrin-formaldehyde resin condensate is formed by reacting a polyalkylene polyamine with urea to form a polyureide intermediate, quenching the polyureide-forming reaction, reacting the polyureide with epihalohydrin and finally reacting the polyureide-epihalohydrin intermediate with formaldehyde to form the water-soluble, cationic, thermosetting resin product. The product is useful as a wet-strength additive in paper and as the resin component in aqueous printing fluids which are, in turn, useful in the high speed printing or decorating of absorbent papers.

8 Claims, No Drawings

WET-STRENGTH RESINS AND PROCESSES FOR MAKING AND USING SAME

CROSS REFERENCES TO RELATED APPLICATIONS

This application is a continuation-in-part of U.S. Pat. Application Ser. No. 200,588, filed Nov. 19, 1971, and now U.S. Pat. No. 3,772,225 and entitled "Polyureide Formaldehyde Resins and Processes for Making and Using Same," said Ser. No. 200,588 being a continuation of U.S. Pat. Application Ser. No. 866,387, filed on Oct. 14, 1969, which is now abandoned, the disclosures of which are incorporated herein by reference.

BACKGROUND OF THE INVENTION

1. Field of the Invention

This invention relates to novel, water-soluble, cationic, thermosetting polyureide-epihalohydrin-formaldehyde resin condensates, to a process for preparing such resins, to a process for employing these resins in the manufacture of wet-strengthened paper, to the wet-strengthened paper comprising these resins as a wet-strength additive, to aqueous printing fluids comprising such resins as a binder component, and to absorbent papers printed with said fluid.

2. Description of the Prior Art

There are a multitude of water-soluble, cationic, thermosetting resins disclosed in the prior art, including a number of such resins which are specifically designed for use as wet-strength additives in paper-making process (cf., for example, U.S. Pat. Nos. 2,345,543; 2,485,079; 2,485,080; 2,554,475; 2,683,134; 2,699,435; 2,769,799; 2,926,116; 2,926,154; 3,060,156; 3,086,061; 3,207,656; 3,216,979; 3,250,664; 3,275,605; 3,311,594; 3,320,215; 3,420,735; and the like). In many instances, however, these prior art resins have a tendency to gell on standing, unless they were maintained as very dilute solutions, and in a number of other instances the resins, in the presence of water, tend to depolymerize or degrade, resulting in a decrease in viscosity and a loss of efficiency as wet-strength additives.

SUMMARY OF THE INVENTION

The novel, water-soluble, cationic, thermosetting resins of this invention are prepared by reacting a polyalkylene polyamine with a urea to form a polyureide intermediate, quenching the polyureide-forming reaction, reacting the polyureide with epihalohydrin, and then reacting the polyureide-epihalohydrin intermediate with formaldehyde to form a water-soluble, cationic, thermosetting, polyureide-epihalohydrin-formaldehyde resin condensate. Aqueous solutions of the resulting polyureide-epihalohydrin-formaldehyde resin condensate are highly stable solutions, even in relatively high concentrations (e.g., solutions having concentrations of approximately 30 percent non-volatile solids [N.V.S]), and these polyureide-epihalohydrin-formaldehyde condensates have been proven to be useful as wet-strength additives in paper-making processes to impart wet-strength to papers obtained therefrom. These resins have also been found to be useful as the resin component in aqueous printing fluids designed for the high-speed printing or decorating of absorbent papers — printing fluids similar to those disclosed, for example, in U.S. Ser. No. 619,210, filed on Feb. 28, 1967 in the name of Robert W. Faessinger and entitled "Aqueous Printing Fluids for Paper," the disclosure of said application being incorporated herein by way of reference thereto.

DESCRIPTION OF THE PREFERRED EMBODIMENTS

As indicated above, the polyureide-epihalohydrin-formaldehyde resin condensates of this invention are prepared by reacting a polyalkylene polyamine with a urea to form a relatively high molecular weight polyureide intermediate, then quenching the polyureide-forming reaction, reacting the polyureide with epihalohydrin and then finally reacting the polyureide-epihalohydrin intermediate with formaldehyde to form a water-soluble, cationic, thermosetting, polyureide-epihalohydrin-formaldehyde resin condensate.

A significant additional improvement in both stability and bleedfastness is obtained when the quenching is with an organic hydroxyl-containing compound. Without wishing to be bound by any particular theory or structure, it has been found that quenching the polyureide-forming reaction with an organic hydroxyl-containing compound prevents or at least minimizes the degradation or hydrolysis of the polyureide intermediate, thereby providing a relatively high molecular weight polymeric backbone for further reaction in order to provide a highly stable polyureide-epihalohydrin-formaldehyde resin condensate.

The polyalkylene polyamines which are useful in preparing the polyureide-epihalohydrin-formaldehyde resin condensates of this invention are represented by the general formula

$$NH_2(RNH)_nH$$

wherein R is an alkylene group containing from 2 to about 8 carbon atoms, but preferably up to about four carbon atoms, and $n$ is an integer of from 2 to about 5. Illustrative of such polyalkylene polyamines are compounds such as polyethylene polyamines (e.g., diethylene triamine, triethylenetetramine, tetraethylene pentamine, and the like), polypropylene polyamines (e.g., dipropylene triamine, and the like) and polybutylene polyamines (e.g., dibutylene triamine), including mixtures thereof.

The organic hydroxyl-containing compounds employed to quench the polyureide-forming reaction to obtain an improved resin include those compounds which, in aqueous media, exist in a hydrated form, (e.g., compounds such as formaldehyde, which in water exists as formaldehyde hydrate (methylene glycol), and are illustrated by compounds such as formaldehyde, paraformaldehyde, aliphatic alcohols, e.g., methyl alcohol, ethyl alcohol, normal propyl alcohol, isopropyl alcohol, tertiary butyl alcohol, and the like), aliphatic polyols e.g., ethylene glycol, glycerine, diethylene glycol, triethylene glycol, and the like), simple sugars or hexoses (e.g., glucose, and the like), simple sugar alcohols (e.g., sorbitol, and the like), and anhdyrides of simple sugar alcohols (e.g., sorbitan, and the like).

The epihalohydrins to be used in the process include those halo-substituted monoepoxy compounds, such as, for example, epichlorohydrin, epibromohydrin, 2,3-epoxy-2-methyl-1-chloroprene, 2,3-epoxy-1-chlorobutane, 2,3-epoxy-1-bromo-butane, 2,3-epoxy-1-chloropentane, and the like. Epichlorohydrin is particularly preferred.

In the initial step of the process employed in preparing the polyureide-epihalohydrin-formaldehyde resin condensates of this invention, the polyalkylene polyamine is reacted with urea in mole ratio of from about 0.1 to about 1.0 moles of amine per mole of urea, with a ratio of from about 0.2 to about 0.4 moles of amine per mole of urea being preferred.

At atmospheric pressures, the polyureide-forming reaction is conducted at temperatures of from about 110°C to about 180°C, with temperatures of from about 130°C to about 150°C being preferred. The reaction mixture is usually taken slowly up to the desired reaction temperature over a period of from about 1 to about 4 hours, and then held at the desired reaction temperature for a period of from 15 minutes to about 1 hour. Upon heating the reaction mixture up to the desired reaction temperature, the ammonia by-product can initially be observed evolving at around 95°C, with maximum evolution of ammonia taking place at temperatures of from about 110°C to about 130°C.

After conducting the polyureide-forming reaction for the desired length of time, the reaction mixture is then quenched by the addition of a suitable solvent, such as water, or preferably an organic hydroxyl-containing compound. When a relatively low boiling organic hydroxyl-containing compound is used such as a formaldehyde, an alcohol, or an aqueous solution of a sugar, a sugar alcohol or an anhydride of a sugar alcohol, the reaction mixture should be cooled to a temperature of about 120°C before adding the organic hydroxyl-containing compound. If, however, a polyol is employed to quench the polyureide-forming reaction, these quenching agents can be added directly to the polyureide-forming reaction mixture without first cooling down the reaction mixture.

As indiated above, a significant improvement in shelf life (stability) is obtained by the use of organic, hydroxyl-containing compounds to quench the polyureide-forming reaction which prevents or at least minimizes the degradation or hydrolysis of the polyureide intermediate, thereby providing a relatively high-molecular weight polymeric backbone for further reaction with epihalohydrin and then with formaldehyde to form the polyureide-epihalohydrin-formaldehyde condensation products of this invention. Evidence of this can be seen in Table 1, wherein the various polyureide intermediates were made under essentially the same reaction condition (i.e., same mole ratios of polyalkylene polyamine to urea, same reaction times and temperatures, etc.), but were quenched with the same volumes of (1) water, (2) 37 percent aqueous formaldehyde, and (3) ethylene glycol. Since viscosity is a function of molecular weight, it should be apparent that the process of this invention employing the organic hydroxyl-containing quench provides a higher molecular-weight polyureide intermediate for further reaction than does the process when water is employed to quench the polyureide-forming reaction.

After quenching the polyureide-forming reaction, the quenched polyureide reaction mixture is then further reacted with epihalohydrin to produce the polyureide-epihalohydrin intermediate. This reaction is moderately exothermic but cooling is not required if reasonable care is used in gradually adding the epihalohydrin to the quenched polyureide. Reaction temperatures of from about 40°C to about 80°C are preferred. Preferably, the quenched polyureide reaction mixture is cooled to about 35°C to 55°C before addition of the epihalohydrin since higher temperatures for the quenched polyureide reaction mixture will cause a more vigorous exothermic reaction during the addition of the epichlorohydrin which may require a reflux. It is preferred to employ from about 0.018 moles epihalohydrin to about 0.30 moles epihalohydrin per mole of urea employed in making the polyureide with from 0.035 to 0.20 moles per mole of urea being more preferred and about 0.144 moles epihalohydrin per mole of urea being particularly preferred.

The polyureide-ephihalohydrin intermediate is further reacted with formaldehyde to form the polyureide-epihalohydrin-formaldehyde resin condensates of this invention. From about 1.0 to about 3.0 moles of formaldehyde per mole of the urea used to form the polyureide is preferred, with from about 1.5 to about 2.2 moles per mole of the urea used to form the polyureide being particularly preferred. This formaldehyde reaction step of the process of this invention is usually conducted in two stages, the first being the methylolation of the quenched polyureide-epihalohydrin intermediate and the second being the condensation of the methylolated intermediate. The methylolation stage is usually carried out at a temperature of from about 65°C to about 85°C and at a pH of from about 8.0 to about 9.5 for from about 10 to about 100 minutes; and the final condensation stage is conducted at a temperature of from about 65°C to about 100°C and preferably at a pH of from about 4.5 to about 7.0 for from about 30 to about 120 minutes. A mineral acid such as phosphoric acid can be employed to lower the pH if desired for the final condensation stage which gives the benefit of shorter reaction times. The condensation stage is usually conducted until the solution of the polyureide-epihalohydrin-formaldehyde resin condensate becomes a viscous syrup at the point of incipient gellation, at which time the condensation reaction is terminated by diluting the reaction mixture with water, aqueous formaldehyde, or alcohol and adjusting the pH if necessary to from about 6.0 to about 7.0 with alkali. The resulting polyureide-epihalohydrin-formaldehyde resin condensate should have a viscosity of from about 20 to about 70 centistokes at 25°C and approximately 30 percent by weight of non-volatile solids. If greater bleedfastness is desired, the dilution of the polyureide-epihalohydrin-formaldehyde resin condensate with water, aqueous formaldehyde or alcohol prior to neutralization can be performed several times, allowing the viscosity of the solution to again build after each dilution but the last to a point of incipient gellation, thereby providing a final resin condensate of greater efficiency and higher molecular weight.

Evidence of the improved stability of the polyureide-epihalohydrin-formaldehyde resin condensates of the present invention over those prepared without epihalohydrin can be seen in Table 2. The resin identified as Resin No. 1 is a polyureide-formaldehyde resin and was made from a water quenched polyureide intermediate thereby having a relatively low-molecular weight whereas the resin identified as Resin No. 2 is a polyureide-formaldehyde resin but with a polyureide quench with a hydroxyl containing compound. As can be seen from Table 2, all the resins initially have properties which are substantially the same, thereby enabling them to be employed as the resin component in aqueous fluids designed for the high-speed printing of absorbent paper webs under substantially the same operating conditions. After a few days, however, Resin No. 1 had depolymerized to a point where the initial operating conditions would have to be modified in order for the resin to be operable in such fluids (e.g., lowering the pH of the fluid wherein the resin is employed, etc.), and within a week this resin has depolymerized to a point wherein a fluid comprising this resin is no longer a commercially acceptable fluid. Resin No. 2 maintains its viscosity over the entire five week period and is useful for about ten weeks before gelling, thereby providing a fluid comprising this resin which can be employed under substantially the same operating conditions over the entire period. The resins of the present invention have a much longer life without gelling as seen in Table 2 and can be used as a printing fluid despite their low viscosity at certain points in their shelf life.

Although the resins made in accordance with the following examples are usually employed as beater-additive types of wet-strength resins, they may also be used to impregnate a paper sheet by immersion, spraying, etc. After such treatments the paper sheet may be further processed to cure the resin. Normally, this resin is self-curing at the proper pH and no extra treating step is needed. As indicated above, these resins are preferably incorporated into pulp by adding such resins to the aqueous suspension of paper stock or furnish in the beater stock chest, Jorden engine, fan pump, headbox or at any other suitable point ahead of the wire or sheet forming stage of a paper-making process.

An advantageous amount of resin added to the paper sheet constitutes about 0.1 percent to about 5 percent is preferred. However, the amount may be varied to suit the particular need.

Paper and pulp slurries having a pH below about 7.0 may be effectively treated with these novel resins.

In addition to their use as wet-strenth additives in paper-making process, the highly stable polyureide-epihalohydrin-formaldehyde resin condensates of this invention can also be employed as the resin component in aqueous printing fluids designed for use in high-speed printing or decorating processes for absorbent cellulosic web materials, said fluids being broadly disclosed, for example, in U.S. Ser. No. 619,210 which is incorporated herein by reference.

The following specific examples are set forth primarily for the purpose of illustrating the present invention, and are not intended to limit the scope thereof in any way. All parts or percentages set forth in these examples are parts or percentages by weight, and not by volume, unless the contrary is clearly expressed therein.

EXAMPLE I

One hundred seventy-eight grams of urea and 118 grams of a mixture of amines consisting of 66⅔ percent triethylene-tetramine and 33⅓ percent diethyltriamine were placed in a 3-neck flask equipped with a mechanical stirrer, thermometer and condenser. The mixture was heated over a 41 minute period to a temperature of 150°C and maintained between 140°C – 150°C for about 40 minutes. The resulting reaction mixture containing the resulting polyureide intermediate was then quenched at 140°C by the addition of 81 grams of ethylene glycol. The polyureide intermediate was cooled to a temperature of 48°C and 40 grams of epichlorohydrin was slowly added over a period of 1 minute, after which the reaction went exothermic, reaching a maximum temperature of 78°C 5 minutes after the epichlorohydrin addition. Four hundred grams of 37 percent formaldehyde were added to the polyureide-epichlorohydrin reaction product and the mixture was heated to 83°C and held between 80°C – 85°C for about 90 minutes. Then 5 cc's of 85 percent phosphoric acid were added to the resulting reaction mixture. A reaction temperature of 85°C – 93°C was maintained until the resin solution changes to a viscous syrup at a point of incipient gelation ((75 minutes); and then 525 cc's of water and 25 cc's of aqueous 10 percent sodium hydroxide were added. The resulting reaction mixture was then cooled to room temperature to provide an aqueous solution of a polyureide-epichlorohydrin-formaldehyde resin condensate having a viscosity of 54.0 centistokes at 25°C, a pH of 7.2, and a non-volatile solids content of 32.2 percent.

EXAMPLE II

One hundred seventy-eight grams of urea and 178 grams of a mixture of amines consisting of 66⅔ percent triethylene-tetramine and 33⅓ percent diethyltriamine were placed in a 3-neck flask equipped with a mechanical stirrer, thermometer and condenser. The mixture was heated over a 45 minute period to a temperature of 150°C and maintained between 150°C – 160°C for about 30 minutes. The resulting reaction mixture containing the resulting polyureide intermediate was then quenched (at 160°C) by the addition of 80 grams of ethylene glycol. The polyureide intermediate was cooled to a temperature of 45°C and 60 grams of epichlorohydrin was slowly added over a period of one minute, after which the reaction went exothermic reading a maximum temperature of 75°C 5 minutes after the epichlorohydrin addition. Four hundred grams of 37 percent formaldehyde were added to the polyureide-epichlorohydrin reaction product and the mixture was heated to 90°C and held between 90°C – 98°C mixture until the resin solution changes to a viscous syrup (134 minutes); and then 525 cc's of water were added. The resulting reaction mixture was then cooled to room temperature to provide an aqueous solution of a polyureide-epichlorohydrin-formaldehyde resin condensate having a viscosity of 25.3 centistokes at 25°C, a pH of 6.5, and a non-volatile solids content of 33.1 percent.

EXAMPLE III

One hundred seventy-eight grams of urea and 118 grams of a mixture of amines consisting of 66⅔ percent triethylene-tetramine and 33⅓ percent diethyltriamines were placed in a 3-neck flask equipped with a mechanical stirrer, thermometer and condenser. The mixture was heated over a 49 minute period to a temperature of 150°C and maintained between 149°C –158°C for about 60 minutes. The resulting reaction mixture containing the resulting polyureide intermediate was then cooled to 120°C and quenched by the addition of 81 grams of water. The polyureide intermediate was cooled to a temperature of 80°C and 400 grams of 37 percent formaldehyde were added. The temperature of the resulting mixture was maintained between 80°C – 90°C for about 24 minutes. Then the mixture was cooled to 64°C and 40 grams of epichlorohydrin were added with little or no exothermic reaction occuring. The resulting mixture was heated to 90°C and 5 cc's of 85 percent phosphoric acid were added. A reaction temperature of 90°C – 95°C was maintained until the resin solution changes to a viscous syrup at a point of incipient gelation (115 minutes); and then 525 cc's of water and 25 cc's of aqueous 10 percent sodium hydroxide were added. The resulting reaction mixture was then cooled to room temperature to provide an aqueous solution of a polyureide-epichlorohydrin-formaldehyde resin condensate having a viscosity of 49.2 centistokes at 25°C, a pH of 7.2, and a non-volatile solids content of 26.3 percent.

EXAMPLE IV

One hundred seventy-eight grams of urea and 118 grams of a mixture of amines consisting of 66⅔ percent triethylene-tetramine and 33⅓ percent diethyltriamine were placed in a 3-neck flask equipped with a mechanical stirrer, thermometer and condenser. The mixture was heated over a 36 minute period to a temperature of 150°C and maintained between 150°C – 157°C for about 31 minutes. The resulting reaction mixture containing the resulting polyureide intermediate was then quenched at 157°C by the addition of 81 grams of ethylene glycol. The polyureide intermediate was cooled to a temperature of 60°C and 40 grams of epichlorohydrin was slowly added over a period of 1 minute, after which the reaction went exothermic, reaching a maximum temperature of 82°C 5 minutes after the epichlorohydrin addition. Four hundred grams of 37 percent formaldehyde were added to the polyureide-epichlorohydrin reaction product and the mixture was heated to 83°C and held between 80°C – 95°C for about 26 minutes. Then 5 cc's of 85 percent phosphoric acid were added to the resulting reaction mixture. A reaction temperature of 85°C – 93°C was maintained until the resin solution changes to a viscous syrup at a point of incipient gelation (48 minutes); and then 525 cc's of water and 25 cc's of aqueous 10 percent sodium hydroxide were added. The resulting reaction mixture was then cooled to room temperature to provide an aqueous solution of a polyureide-epichlorohydrin-formaldehyde resin condensate having a viscosity of 77.6 centistokes at 25°C, a pH of 7.1, and a non-volatile solids content of 31.7 percent.

EXAMPLE V

A standard water-soluble green dye fluid was prepared for use in determining the shelf-life and bleedfastness of printing fluids employing the resins of the present invention in comparison with similar wet-strength resins. Green dye was chosen for use in the printing fluids since green is a very difficult color with which to obtain good shelf life and bleedfastness. The green dye fluid consisted of: 400 grams of water; 48.6 grams of Yellow RA dye available from DuPont (color index direct yellow 50) 7.4 grams of Sky Blue M available from DuPont (color index direct blue 15); 1.6 grams Red 8BLX available from DuPont (color index direct red 81) and 1.7 grams of a surfactant. With this standard dye solution, printing fluids were made up at a ratio of 4.5 grams resin per 4.6 grams of green dye fluid.

The printing fluid was then applied in a pattern onto a soft, absorbent, two-ply dry creped paper (commercially available facial tissue). The printed paper was then tested for colorfastness (bleedfastness) and assigned a transfer rating of 0 (no bleeding) and higher ratings depending on the amount of bleeding. The transfer rating measurement was determined by the method taught in U.S. Pat. No. 3,389,108, the disclosure of which is incorporated herein by reference. The transfer rating (bleedfastness) was measured after 96 hours of aging after printing and when exposed to water, ammonia solution, milk and soap respectively. Printing fluids were prepared employing Resin No. 2, the resin of Example I and the resin of Example 3. Three printing fluids were made up for each resin and adjusted to different pH values. In addition to determining the bleedfastness of the respective printing fluids, a sample of the printing fluid was stored and the number of days storage before the printing fluid gelled was determined. The results are given in Table 3.

As can be seen from the results indicated in Tables 1 – 3, the resins of this invention possess vastly improved bleedfastness and when produced with a hydroxyl quench of the polyureide they also possess significantly improved stability both as a resin (the form used for imparting wet-strength in paper-making) and as a printing fluid.

The sequence of reacting the polyureide with epihalohydrin then formaldehyde can be reversed as shown by Example III.

TABLE 1

| Sample | Quenching Agent | Percent (by weight of Non-volatile solids in the Quenched Product) | Viscosity (Centistokes at 25°C) |
|---|---|---|---|
| 1 | Water | 77.0 | 587 |
| 2 | 37% Formaldehyde | 77.1 | 22,980 |
| 3 | Ethylene Glycol | Diluted with water to 77.0 | 235,626 |

TABLE 2.—RESIN STABILITY

Viscosity in centistokes at 23° C. for various days of aging

| | 0 | 1 | 2 | 4 | 5 | 7 | 10 | 13 | 14 | 18 | 21 | 24 | 28 | 35 | 42 | 45 | 52 | 62 | 69 | 80 | 139 |
|---|---|---|---|---|---|---|---|---|---|---|---|---|---|---|---|---|---|---|---|---|---|
| A[1] | 51.9 | | 38.0 | 31.1 | | 28.1 | | | 26.3 | | 29.1 | | 30.2 | 0 | | | | | | | |
| B[2] | 54.0 | | 55.0 | 55.3 | | 46.8 | | | 44.2 | | 45.1 | | 50.4 | 55.8 | | 72.1 | 88.2 | | 186.0 | Gel | |
| C[3] | 77.6 | 72.1 | | | 50 | | | 34.7 | | | 32.2 | | | 30.1 | | | | | | | 74.2 |
| D[4] | 9.2 | | | | | | 20.8 | | | 22.3 | | 19.1 | | | | 20.5 | | | | | |

NOTE:
A[1] is Resin No. 1.
B[2] is Resin No. 2.
C[3] is Example IV.
D[4] is Example III.

TABLE 3

| RESIN | pH | Shelf-life Days | Bleedfastness (96 hrs) | | | |
|---|---|---|---|---|---|---|
| | | | $H_2O$ | $NH_3$ | Milk | Soap |
| Resin No. 2 | 5.5 | 5 | 0+ | 1+ | 0+ | 1+ |
| Resin No. 2 | 6.0 | 25 | 0+ | 2+ | 1+ | 2+ |
| Resin No. 2 | 6.5 | 40 | 1+ | 3+ | 2+ | 3+ |
| Ex. I | 5.5 | 20 | 0 | 0 | 0 | 0 |
| Ex. I | 6.0 | 46 | 0 | 0+ | 0+ | 0 |
| Ex. I | 6.5 | 94 | 0 | 0+ | 0+ | 0+ |
| Ex. III | 5.5 | 9 | 0 | 0 | 0 | 0 |
| Ex. III | 6.0 | 19 | 0 | 0+ | 0+ | 0+ |
| Ex. III | 7.0 | 58 | 0 | 0+ | 0+ | 1+ |
| Ex. III[1] | 5.5 | — | 0 | 0+ | 0+ | 0+ |
| Ex. III[1] | 6.0 | — | 0 | 0+ | 0+ | 0+ |
| Ex. III[1] | 7.0 | — | 1+ | 1+ | 1+ | 1+ |
| Ex. III[2] | 5.5 | — | 0+ | 0+ | 0+ | 0 |
| Ex. III[2] | 6.0 | — | 0+ | 0+ | 0+ | 0+ |
| Ex. III[2] | 7.0 | — | 0+ | 0+ | 0+ | 0+ |
| Ex. III[3] | 5.5 | — | 0 | 0+ | 0+ | 0 |
| Ex. III[3] | 6.0 | — | 0 | 0+ | 0+ | 0+ |
| Ex. III[3] | 7.0 | — | 0 | 0+ | 0+ | 1+ |

1 - Resin aged 10 days before printing fluid was made
2 - Resin aged 18 days before printing fluid was made
3 - Resin aged 24 days before printing fluid was made

What is claimed is:

1. A process for preparing a water-soluble, cationic, thermosetting resin which comprises:
   A. reacting a polyalkylene polyamine, having the general formula $NH_2(RNH)_nH$ wherein R is an alkylene group containing from two to about eight carbon atoms and n is an integer of from 2 to about 5, with a urea to form a polyureide intermediate;
   B. quenching the polyureide-forming reaction;
   C. reacting the quenched polyureide intermediate with epihalohydrin to form a polyureide-epihalohydrin intermediate; and
   D. reacting the polyureide-epihalohydrin intermediate with formaldehyde to form a water-soluble, cationic, thermosetting polyureide-epihalohydrin-formaldehyde resin condensate.

2. A process as claimed in claim 1 wherein the polyalkylene polyamine is at least one member of the group consisting of polyethylene polyamines, polypropylene polyamines and polybutylene polyamines.

3. A process as claimed in claim 2 wherein:
   a reaction mixture containing from about 0.1 mole to about 1.0 mole of polyalkylene polyamine per mole of urea is heated up to a reaction temperature of from about 110°C to about 180°C over a period of from one to about four hours and then held at the reaction temperature for a period of from about 15 minutes to about one hour to form the polyureide intermediate;
   the polyureide-forming reaction is quenched with an organic, hydroxyl-containing compound;
   the quenched polyureid intermediate is reacted with from 0.05 to 0.30 moles of epihalohydrin per mole of said urea used to form the polyureide intermediate to form a polyureide-epihalohydrin intermediate; and
   reacting the polyureide-epihalohydrin intermediate with from about 1.0 to about 3.0 moles of formaldehyde per mole of the urea used to form the polyureide intermediate to form the polyureide-epihalohydrin-formaldehyde resin condensate.

4. A process as claimed in claim 3 wherein the reaction of the formaldehyde with the polyureide-epihalohydrin intermediate is a two stage reaction comprising:
   A. the methylolation of the polyureide-epihalohydrin intermediate at a temperature of from about 65°C to about 85°C and at a pH of from about 8.0 to about 9.5 for a period of from abut 10 minutes to about 30 minutes; and
   B. the condensation of the methylolated polyureide intermediate at a temperature of from about 65°C to about 80°C and at a pH of from 4.5 to about 5.5 for a period of from about 30 minutes to about 120 minutes.

5. A process as claimed in claim 4 wherein the pH is lowered for the condensation stage by the addition of a mineral acid to the reaction mixture, and wherein the condensation stage of the reaction is terminated by diluting the reaction mixture with water, aqueous formaldehyde, or alcohol and adjusting the pH of the diluted reaction mixture to a pH of from about 6.0 to about 7.0 by the addition of alkali to the diluted reaction mixture.

6. A process as claimed in claim 5 wherein a mixture of triethylene tetramine and diethylene triamine are reacted with urea to form the polyureide intermediate and the polyureide-forming reaction is quenched with an aqueous formaldehyde solution.

7. A process as claimed in claim 5 wherein a mixture of triethylene tetramine and diethylene triamine are reacted with urea to form the polyureide intermediate and the polyureide-forming reaction is quenched with ethylene glycol.

8. The product of the process claimed in claim 1.

* * * * *